US008297631B2

(12) United States Patent
Siebeneick et al.

(10) Patent No.: US 8,297,631 B2
(45) Date of Patent: Oct. 30, 2012

(54) WHEEL HUB JOINT UNIT FOR A VEHICLE

(75) Inventors: Jürgen Siebeneick, Oberwesel (DE);
Richard Starck, Falkenstein (DE)

(73) Assignee: GM Global Technology Operations LLC, Detroit, MI (US)

( * ) Notice: Subject to any disclaimer, the term of this patent is extended or adjusted under 35 U.S.C. 154(b) by 292 days.

(21) Appl. No.: 12/350,834

(22) Filed: Jan. 8, 2009

(65) Prior Publication Data
US 2009/0180726 A1    Jul. 16, 2009

(30) Foreign Application Priority Data
Jan. 9, 2008   (DE) .................. 10 2008 003 646

(51) Int. Cl.
*B62D 7/18*    (2006.01)
(52) U.S. Cl. .................................. 280/93.512; 464/178
(58) Field of Classification Search .................. 464/178; 384/544, 589; 301/105.1, 124.1; 280/93.511, 280/93.512; 180/256
See application file for complete search history.

(56) References Cited

U.S. PATENT DOCUMENTS

| 5,048,859 | A  | * | 9/1991  | Nishikuma et al. .. 280/93.512 X |
| 5,975,767 | A  | * | 11/1999 | Mizukoshi et al. ........... 384/544 |
| 6,390,221 | B2 | * | 5/2002  | Goddard et al. ..... 280/93.512 X |
| 6,497,515 | B1 |   | 12/2002 | Sahashi et al. |
| 7,806,597 | B2 |   | 10/2010 | Langer et al. |
| 7,824,272 | B2 |   | 11/2010 | Cermak et al. |
| 2008/0093914 | A1 | * | 4/2008  | Mabuchi et al. ........... 301/105.1 |

FOREIGN PATENT DOCUMENTS

| DE | 19811184 A1 | 9/1999 |
| DE | 10029100 A1 | 3/2001 |
| DE | 102004054907 A1 | 9/2006 |
| WO | WO 2006/051918 A1 * | 5/2006 |
| WO | 2006092121 A1 | 9/2006 |

* cited by examiner

*Primary Examiner* — Gregory Binda
(74) *Attorney, Agent, or Firm* — Ingrassia Fisher & Lorenz, P.C.

(57) ABSTRACT

A wheel hub joint unit is provided that includes, but is not limited to a constant velocity rotary joint and a wheel bearing. The constant velocity rotary joint has a joint outer part. The wheel bearing supports a wheel hub with a double-row bearing, and the double-row bearing is disposed on the joint outer part.

5 Claims, 5 Drawing Sheets

WHEEL HUB JOINT UNIT FOR A VEHICLE

CROSS-REFERENCE TO RELATED APPLICATION

This application claims priority to German Patent Application No. 102008003646.3, filed Jan. 9, 2008, which is incorporated herein by reference in its entirety.

TECHNICAL FIELD

The invention relates to a wheel hub joint unit comprising a constant velocity rotary joint and a wheel bearing. The wheel bearing supports a wheel hub with a double-row wheel bearing.

BACKGROUND

A wheel hub joint unit is known from Document DE 10 2004 054 901 A1. The known wheel hub joint unit comprises a wheel hub—constant velocity rotary joint unit, in which a wheel hub having a through-opening having inner shaft teeth is clamped to the joint outer part of a constant velocity rotary joint. In this case, the inner shaft teeth of the wheel hub engage with the outer shaft teeth of the joint outer part, and a double-row wheel bearing is disposed on the wheel hub and the double-row wheel bearing is clamped between wheel hub and joint outer part by means of a clamping screw.

FIG. 4 shows a schematic diagram of a wheel hub joint unit 30, showing a pivot point 22 of a constant velocity rotary joint 2 disposed as a distance a' from a mounting disk 12, the mounting disk 12 being provided for mounting a wheel rim and/or a brake disk of a drive wheel, and the mounting disk 12 also being designated as wheel hub flange. Such a wheel hub joint unit 30 can be used both for a front wheel drive and also for a rear wheel drive. However, the large distance a' between the pivot point 22 of the constant velocity rotary joint 2 and the mounting disk 12 of the wheel hub 5 is particularly disadvantageously noticeable when the known wheel hub joint unit 30 is to be used in a front wheel drive.

In this case, the front wheel which is mounted with its wheel rim on the wheel disk 12 is pivoted about an axis 21 of the knuckle joint. However, this axis 21 is remote from the mounting disk 12 by a distance a, which is significantly shorter than the distance a' of the pivot point 22 of the constant velocity rotary joint 2. In this case, in order to ensure drive via the drive shaft 8, care must additionally be taken to ensure that the drive shaft 8 cooperates axially displaceably with the constant velocity rotary joint 2 in order to compensate the ensuing length difference for the drive shaft of different distance between a and a' when the wheel hub 5 pivots about the axis 21 of the knuckle joint.

FIG. 5 shows a schematic cross-section through a wheel hub joint unit 30 according to FIG. 4 with further details. A double-row bearing 6 is disposed as wheel bearing 3 on a lateral surface 29 of the wheel hub 5. To this end, a ball bearing seat 23 is incorporated in the lateral surface 29 of the wheel hub 5, on which a first ball bearing row 16 rolls and the balls of the ball bearing row 16 are held in position by a ball bearing cage 28. In addition, the lateral surface 29 of the wheel hub 5 has a press fit 17 with an inner race 18 of a second ball bearing row 19. The balls of the second ball bearing row 19 roll on its inner race 18, which is pressed on to the ball bearing seat 23.

A double-row bearing is understood in this context as a double- or multi-row wheel bearing, which preferably comprises roller bearings such as balls or tapered rollers or cylindrical rollers and is preferably configured as a double angular ball bearing or a double tapered roller bearing.

The two ball bearing rows 16 and 19 have a common ball bearing outer race 20, which is connected to a rear wheel suspension in the case of a rear wheel drive and cooperating with a front wheel suspension via knuckle joint in the case of a front wheel drive. As mentioned above, the joint outer part 4 of the constant velocity rotary joint 2 is drawn into a central bore of the wheel hub 5 with the aid of a central clamping screw 24 along shaft teeth 27 of the joint outer part 4, and a radial stop face 31 pretensions and fixes the inner race 18 of the double-row bearing 6.

Known from the Document DE 100 29 100 A1 is a bearing arrangement for a drive wheel, and a double-row bearing is likewise disposed between a wheel hub and a constant velocity rotary joint and merely a hub-side ball bearing row of the double-row bearing rolls on the wheel hub and a joint-side ball bearing row rolls on the joint outer part and the expensive shaft teeth between wheel hub and joint outer part are replaced by a non-detachable plastic deformation of roughened surfaces.

Finally, a wheel bearing arrangement is known from the Document WO 2006/092121 A1, in which a double-row bearing for mounting a drive wheel is disposed between a wheel hub and a constant velocity rotary joint and merely the shaft teeth between wheel hub and joint outer part are replaced by front teeth.

The known wheel hub joint units 30 have the disadvantage that they require a large installation depth axially, so that their use particularly for front wheel drives is problematical, since the pivot point 22 of the constant velocity rotary joint 2 cannot align with the axis 21 of the knuckle joint as shown in FIG. 4. A further disadvantage is that a plurality of parts such as a wheel hub 5, a joint outer part 4, and ball bearing rows 16 and 19 are held together by a central clamping screw 24 or by plastically deformed surfaces. This is complex to manufacture and costly.

In view of the foregoing, it is at least one object of the invention to provide a wheel hub joint unit, which has a more compact structure, manages with fewer components, and in particular for a front wheel drive, allows improved cooperation between constant velocity rotary joint and knuckle joint. In addition, other objects, desirable features, and characteristics will become apparent from the subsequent summary and detailed description, and the appended claims, taken in conjunction with the accompanying drawings and this background.

SUMMARY

According to an embodiment of the invention, a wheel hub joint unit comprising a constant velocity rotary joint and a wheel bearing is provided. The constant velocity rotary joint has a joint outer part. The wheel bearing supports a wheel hub with a double-row bearing, and the double-row bearing is disposed on the joint outer part.

The wheel hub joint unit has the advantage that a significantly more compact design is possible since the wheel bearing in the form of a double-row bearing can now roll on the joint outer part so that the joint outer part is part of the wheel hub and conversely the wheel hub is a part of the joint outer part without any joining faces. To this end, the wheel hub joint unit preferably comprises a one-piece wheel bearing joint carrier, which integrally combines the functions of the wheel hub and the joint outer part. With this one-piece structure or the one-piece wheel bearing joint carrier, the expenditure for a central clamping screw as well as the expenditure for shaft teeth or front teeth or plastic joining of surfaces between joint outer part and wheel hub is eliminated. On the contrary, wheel hub and joint outer part can be manufactured in one piece at favorable cost from a metal block or metal casting.

The constant velocity rotary joint is preferably disposed on the inside in the wheel bearing joint carrier and the double-row bearing is disposed on the outside on the wheel bearing joint carrier. The distance between the pivot point of the constant velocity rotary joint and a mounting disk for the wheel rim is therefore significantly shortened in an advantageous manner.

In a preferred embodiment of the invention, the wheel hub joint unit comprises a drive shaft, which has the constant velocity rotary joint at its wheel-side end. Furthermore, the wheel bearing joint carrier is preferably sealed toward the drive shaft by a sealing sleeve and toward the wheel, the wheel bearing joint carrier has a centering shoulder of the wheel hub and a mounting disk for fixing a brake disk and/or a wheel rim. Consequently, the wheel bearing joint carrier advantageously takes over all the functions of the wheel hub and the constant velocity rotary joint.

For mounting the wheel or the wheel hub, the wheel bearing joint carrier has an inner roller bearing seat for a first roller bearing row of the double-row bearing incorporated in the outer shell of the joint outer part and a press fit, on which an inner race of a second roller bearing row of the double-row bearing is fixed. The fixing of the inner race of the second roller bearing row can be made by roll hammering in the form of a forming process or by providing a circlip if demounting of the double-row bearing is to be provided within the lifetime of the wheel hub joint unit.

Whereas the inner roller bearing seats of the two roller bearing rows can differ, a common one-piece roller bearing outer race is provided for the roller bearing outer race of the double-row bearing. This roller bearing outer race may now cooperate with a multilink rear suspension if the wheel hub joint unit is provided for a rear wheel drive.

In the case of a front wheel drive, further components of the front wheel drive and in particular the front steering can act on the roller bearing outer race. For this purpose, provision is made for fixing a track rod 323 connecting lever on the common roller bearing outer race to ensure the pivoting movement of the driven front wheel.

In addition, a knuckle joint cooperates with the common roller bearing outer race to allow pivoting of the driven front wheel. Due to the compact design of the wheel bearing joint carrier according to the invention, it is now possible for the pivot point of the constant velocity rotary joint to be in alignment with the axis of the knuckle joint, which the previous wheel hub joint units do not allow or only allow at great expense.

In addition, in a further integration stage, provision is made to configure a roller bearing outer race of the double-row bearing in such a manner that the roller bearing outer race has an least one further axial guide member in one piece. Furthermore, the roller bearing outer race can preferably have all the connecting elements of the axial guide members in one piece. Such an integration stage has the advantage that the weight of the wheel suspension and the wheel guide can be further reduced.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding summary and background of the invention or the following detailed description.

Figure 1:
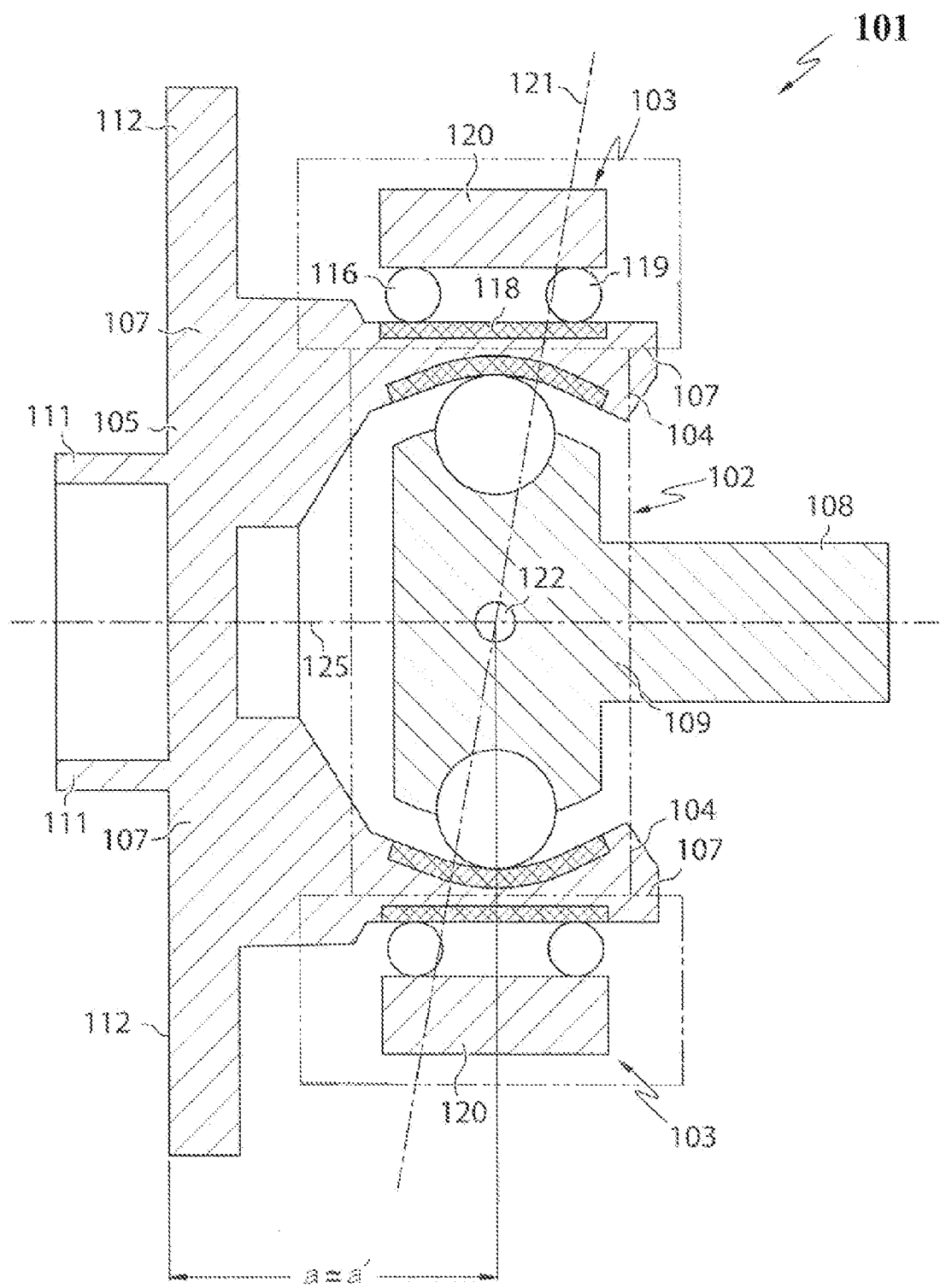
FIG. 1 shows a schematic cross-section through a wheel hub joint unit according to a first embodiment of the invention.

FIG. 1 shows a schematic cross-section through a wheel hub joint unit 101 according to a first embodiment of the invention. In this embodiment of the invention, the wheel hub 105 and the joint outer part 104 form a common one-piece wheel bearing joint carrier 107. In this case, the wheel bearing 103 rolls on an inner race 118 on the outside on the wheel bearing joint carrier 107, and the constant velocity rotary joint 102 is disposed on the inside of the wheel bearing joint carrier 107. Inner race 118 cooperates with a corresponding outer race 120 via respective bearings 116 and 119. Functions of a wheel hub 105 are now taken over by the wheel bearing joint carrier 107, since this wheel bearing joint carrier 107 has a centering shoulder 111 and a mounting disk 112 for a wheel brake disk and/or a wheel rim. In addition, the wheel bearing joint carrier 107 fulfills the requirements for a joint outer part 104.

The compact design of the wheel hub joint unit 101 may be provided both for a rear wheel drive and for a front wheel drive. In this, it is possible to completely dispense with a central clamping screw, which holds together the joint outer part and the wheel hub in the prior art, and shaft teeth or front teeth between the wheel hub 105 and the joint outer part 104, as is usual in the prior art so that the production costs can be reduced and also the total weight of this new wheel hub joint unit 101 decreases. Finally, it is even possible, as shown in FIG. 1 that the pivot point 122 of the constant velocity rotary joint 102 is in alignment with the axis 121 of a steering knuckle joint 223 (see FIG. 2), so that the distance a between the axis of rotation 121 of the steering knuckle joint and the mounting disk 112, and the distance a' between mounting disk 112 and pivot point 122 of the constant velocity rotary joint is approximately the same (i.e., a~a').

Thus, the displacement path of the differential-side end of the drive shaft 108 can be reduced because the induced displacement caused by steering movements tends to zero when a tends to a'. Only a longitudinal displaceability of the drive shaft is necessary to compensate for the upward and downward movements of the driven wheel as before.

Figure 2:
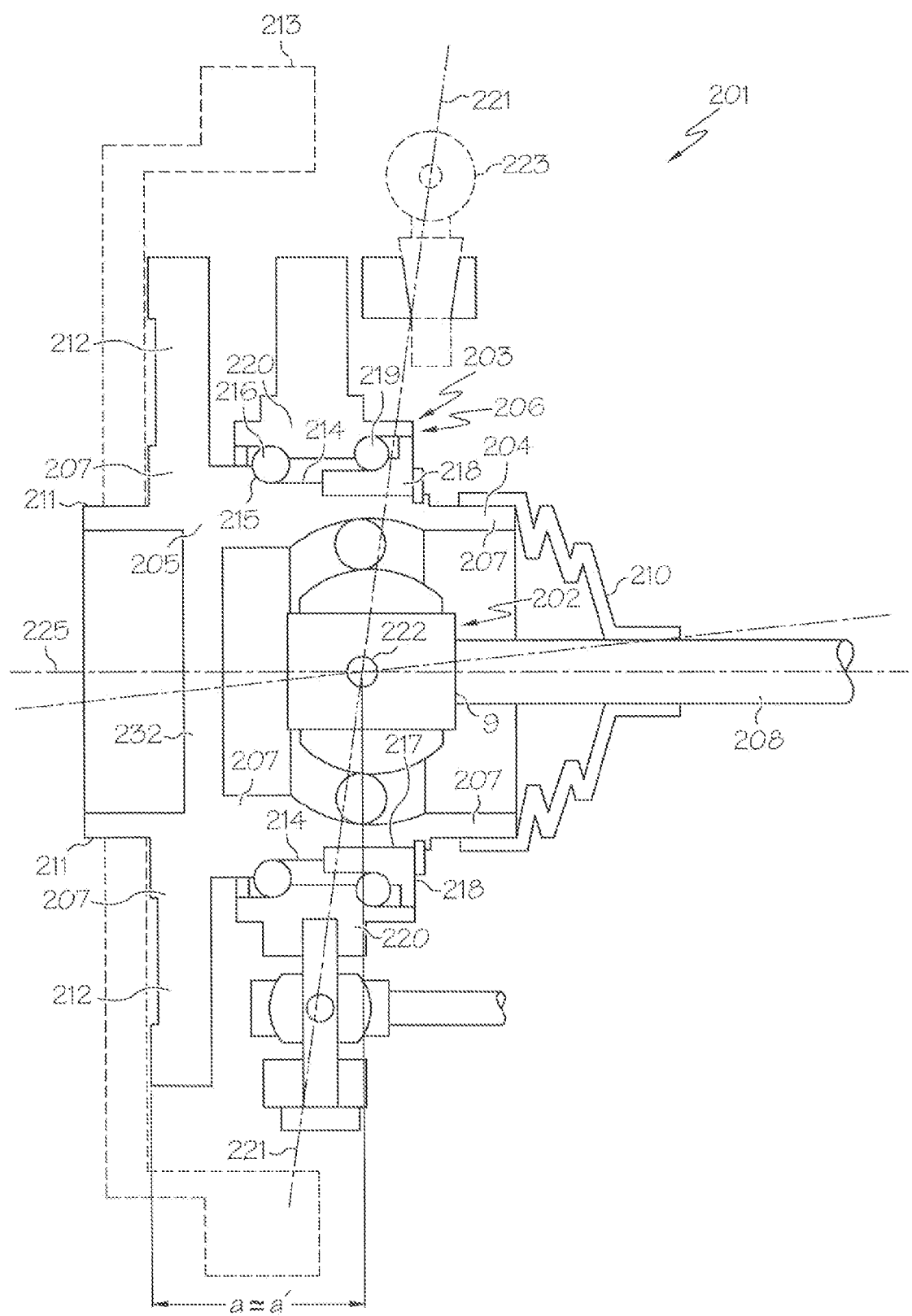
FIG. 2 shows a schematic cross-section through a wheel hub joint unit according to FIG. 1 with further details.

FIG. 2 shows a schematic cross-section through a wheel hub joint unit 201 according to FIG. 1 with further details. Thus, the outlines for the attachment of a brake disk 213 to a mounting disk 212 of a wheel bearing joint carrier 207 are indicated by means of dotted lines in FIG. 2, and a centering shoulder 211 of a wheel bearing joint carrier 207 ensures that the brake disk 213 rotates exactly about an axis 225 of the wheel hub joint carrier 207. On the drive side of the wheel hub joint unit 201 FIG. 2 shows the structure and the arrangement of a double-row bearing 206 on the joint outer part 204 of a constant velocity joint 202, wherein a joint outer part 204 is an integral component of the wheel bearing joint carrier 207 according to an embodiment of the invention, which at the same time comprises a wheel hub 205.

Whereas a velocity rotary joint 202 is disposed in the inside of the wheel bearing joint carrier 207, in this embodiment of the invention, a roller bearing seat 215 for a first roller bearing row 216 is incorporated on the outside on outer shell 214 of the wheel bearing joint carrier 207. Furthermore, a press fit 217 is incorporated on the outer shell 214 of the wheel bearing joint carrier 207, on which an inner race 218 of a second roller bearing row 219 is fixed.

As has already been mentioned above, this fixing can be effected by means of bordering—so-called "roll hammering"—or by fitting a suitable circlip shown in FIG. 2. Whereas in this embodiment of the invention, the inner roller bearing seats 215 and 218 are configured differently for the two roller bearing rows 216 and 219 of the double-row bearing 206, the double-row bearing 206 has a common roller bearing outer ring 220 for both roller bearing rows 216 and 219.

Further components of the axial suspension of a front wheel drive shown in FIG. 2 are provided on this roller bearing outer ring 220 so that, for example, the steering axis 221 of a steering knuckle joint 223 shown in FIG. 2 is obtained, which is now aligned through the pivot point 222 of the constant velocity rotary joint 202. Whereas the wheel hub joint unit 201 is provided with a sealing sleeve 210 toward the drive shaft 208, especially as the drive shaft 208 can move upward and downward with respect to the hub axis 225 with the aid of the constant velocity joint 202, toward the wheel rim side the wheel hub joint unit 201 is sealed by a central cover 232, which rotates with the wheel. As shown here, this central cover 232 can be an integral component of the wheel bearing joint carrier 207 or it can be fitted separately into the wheel bearing joint carrier 207. The cost expenditure for such a cover 232 is minimal compared to a central clamping screw usually used according to the prior art.

Figure 3:
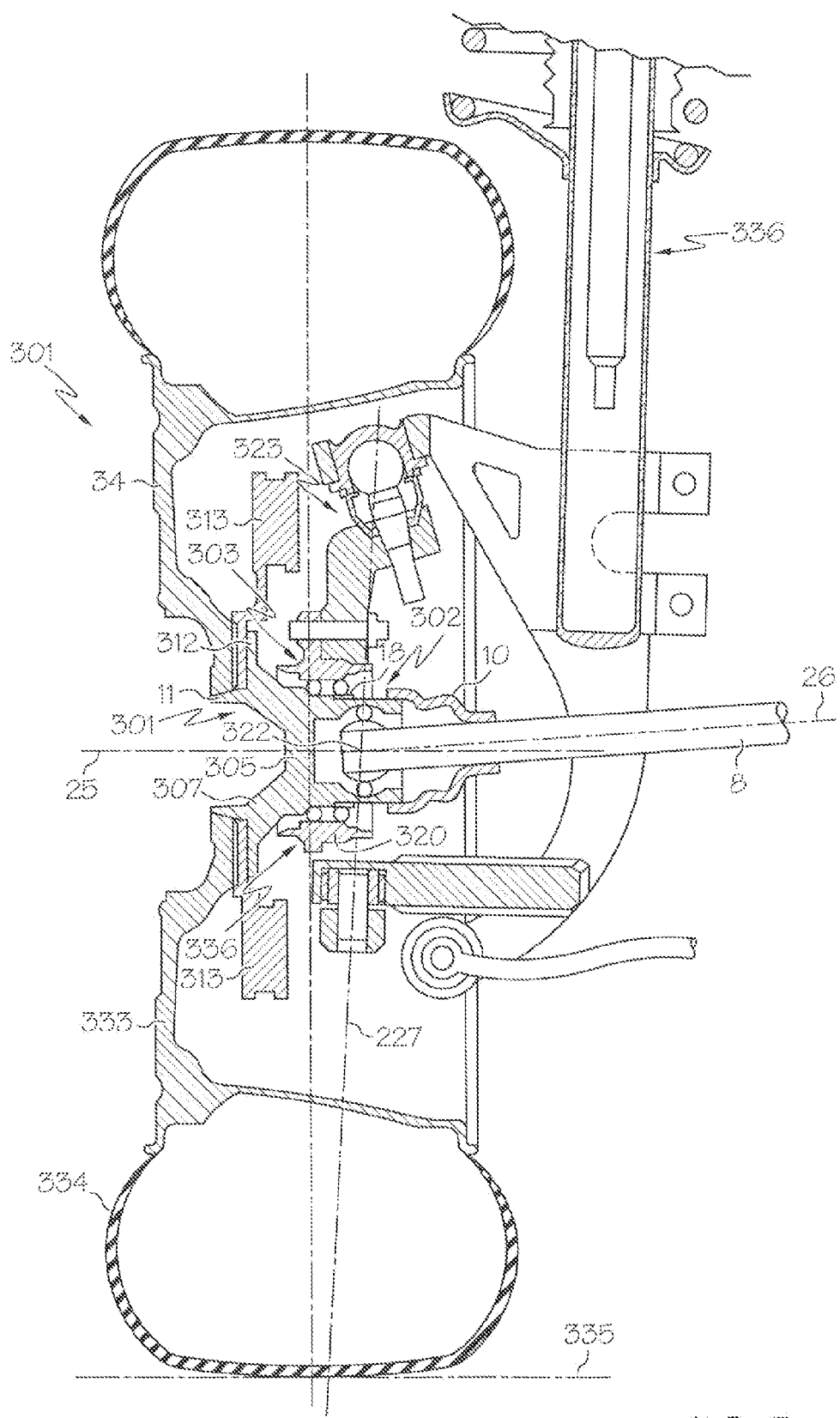
FIG. 3 shows a schematic cross-section through a wheel hub joint unit according to FIG. 1 in a front wheel suspension.
Figure 4:
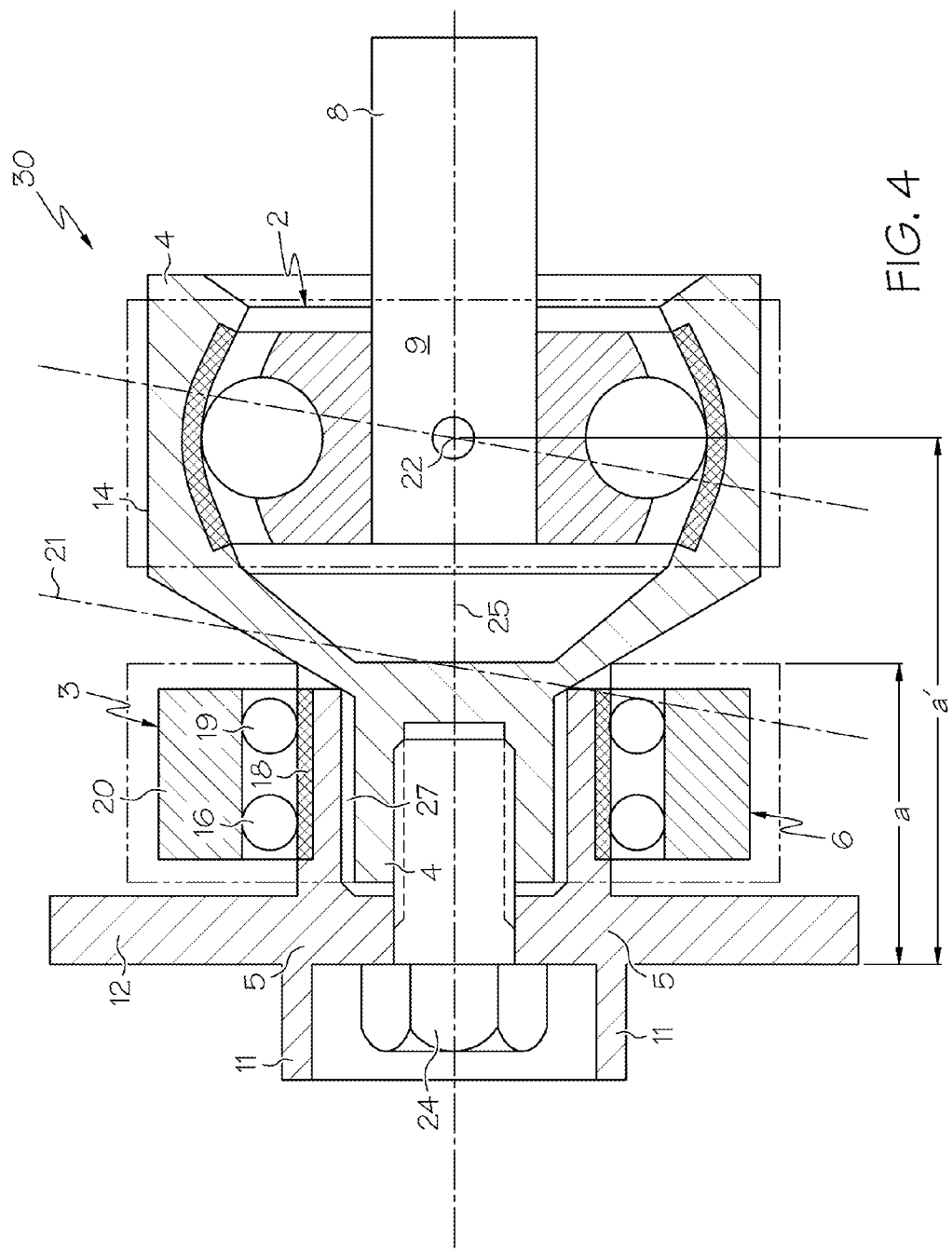
FIG. 4 shows a schematic cross-section through a wheel hub joint unit according to the prior art.
Figure 5:
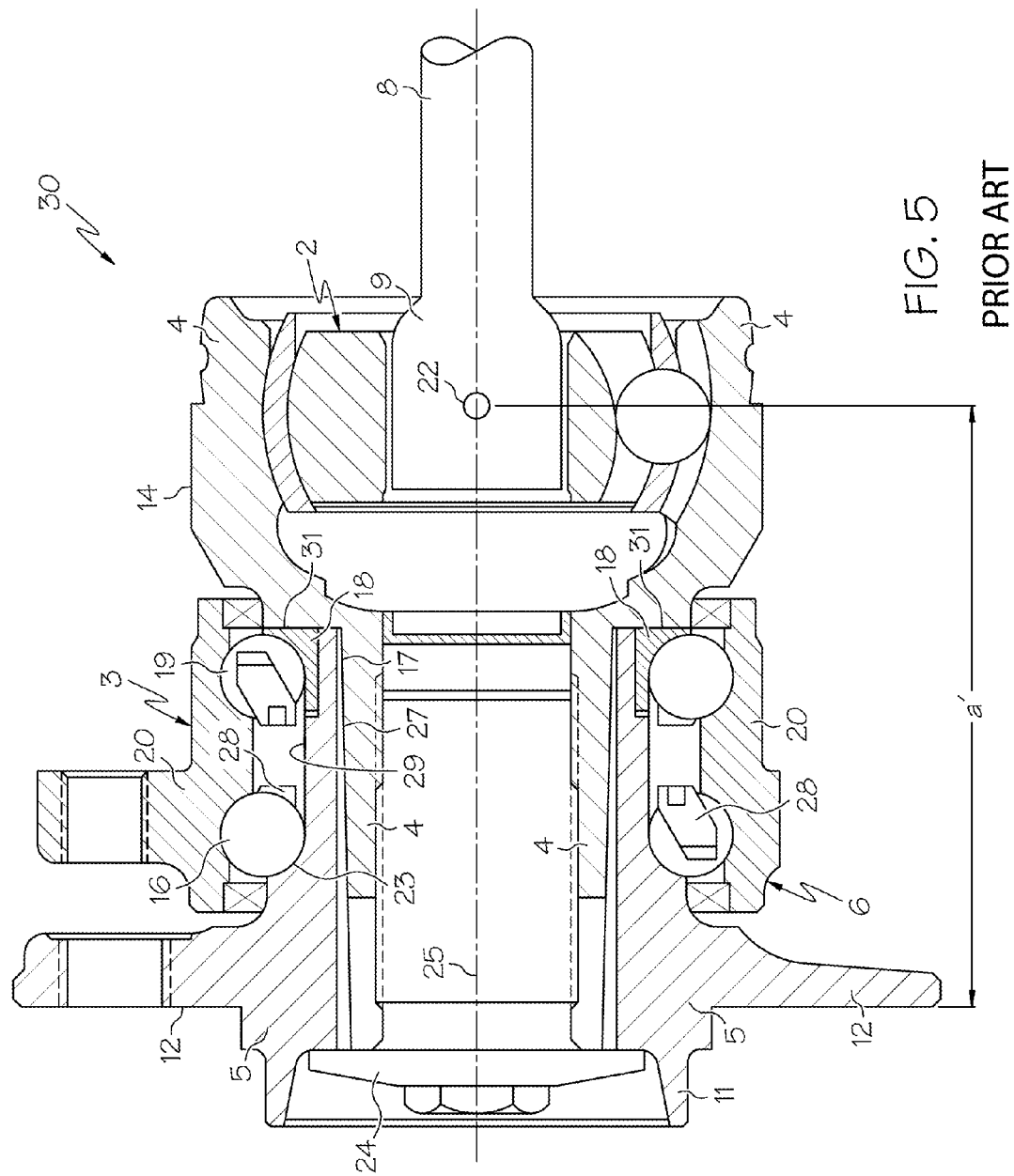
FIG. 5 shows a schematic cross-section through a wheel hub joint unit according to FIG. 4 with further details.

FIG. 3 shows a schematic cross-section through a wheel hub joint unit according to FIG. 1 in a front wheel suspension. To this end, a mounting disk 312 of the wheel bearing joint carrier 307 bears a brake disk 313 and a wheel rim 333, on which a pneumatic front wheel tire 314 is mounted, which rolls with its tread on a road surface 335. In addition to the components of a wheel hub joint unit 301 already discussed in the preceding Figs., FIG. 3 shows the arrangement of an axis 321 of steering knuckle joint of this front wheel drive and a part of a shock absorber system 336, which is intended to absorb unevennesses of the surface 335, and for decoupling the wheel suspension from the bodywork. The weight reduction of the front wheel unit obtained through the new wheel hub joint unit 301 makes a significant contribution to the vibrational decoupling between wheel suspension and vehicle body.

Due to the integration of drive shaft 8 and a wheel bearing 303 achieved with the present invention, the distance "a" between the axis of rotation of the wheel and a pivot point 322 of an outer constant velocity rotary joint 302 of the drive shaft 8 is improved in such a manner that a so-called "drive shaft pumping", i.e., the longitudinal variation between outer and inner pivot point of the drive shaft 8 is reduced and in FIG. 3 is reduced almost to zero. The wheel bearing joint carrier 307 thus at the same time contains the running track of the roller bodies of the wheel bearing 303 and the running track of the rolling bodies of the constant-velocity rotary joint 302 about axis 326 of the drive shaft 8.

Alternatively, unlike the representation in FIGS. 1 to 3, an even higher integration stage can be achieved if the running track of the inner roller bearing row is omitted and the double-row bearing is reduced to a single-row four-point bearing. In another alternative but smaller integration stage, a separate drive shaft is also feasible, which is firmly screwed to shaft teeth and by means of a central thread. As a further logical alternative also having a smaller integration stage, a screwed-on steering arm is also conceivable, whereby the production costs are further reduced.

To sum up, it should be noted that due to the device according to an embodiment of the invention with its weight and cost reduction as well as the saving of two interfaces with corresponding teeth and fits and also with the saving of up to three screw connections, including a central clamping screw as far as the elimination of a knuckle as a single part, the new wheel hub joint unit offers advantages compared with conventional wheel hub joint units. In addition, functional advantages are achieved such as the shortening (or elimination) of the distance a between steering axis 121 and outer pivot point 122 of the drive shaft 8 and a stiffer wheel hub joint unit with improved steering precision.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A wheel hub joint unit for a vehicle, comprising:
a constant velocity rotary joint having a joint outer part and a pivot point;
a wheel hub;
a wheel bearing adapted to support said wheel hub with a double row bearing;
a steering knuckle joint connected to said wheel bearing and having a steering knuckle joint axis of rotation which extends through said pivot point;
wherein said wheel hub comprises a one piece, integral hub manufactured from one of: i) a metal block; and ii) a metal casting;
wherein the double row bearing is disposed on the joint outer part of the constant velocity rotary joint;
wherein the constant velocity rotary joint is disposed inside said wheel hub and said double-row bearing is disposed on an outside on the one piece wheel hub;
wherein the wheel hub joint unit comprises a drive shaft having the constant velocity rotary joint at a wheel side end;
wherein the one-piece wheel hub is sealed toward said drive shaft by a sealing sleeve, the wheel hub joint unit further comprising a mounting disk for fixing at least one of a brake disk or a wheel rim; and
wherein said wheel hub has a first inner bearing race press fit onto said constant velocity joint outer surface and said wheel bearing has a first roller bearing row configured to rollably engage said first inner bearing race.

2. The wheel hub joint unit according to claim 1, wherein said double-row wheel bearing has a common outer bearing surface engaging said first roller bearing row and a second roller bearing row.

3. The wheel hub joint unit according to claim 2, further comprising a track rod connecting lever attached to said double-row wheel bearing.

4. The wheel hub joint unit according to claim 2, wherein said steering knuckle joint cooperates with said common outer bearing surface.

5. The wheel hub joint unit according to claim 4, wherein said steering knuckle joint is configured to turn said wheel hub to thereby steer said vehicle.

* * * * *